United States Patent [19]

Kremer

[11] Patent Number: 5,442,620

[45] Date of Patent: Aug. 15, 1995

[54] APPARATUS AND METHOD FOR PREVENTING COMMUNICATIONS CIRCUIT MISCONNECTIONS IN A BIDIRECTIONAL LINE-SWITCHED RING TRANSMISSION SYSTEM

[75] Inventor: Wilhelm Kremer, Dracut, Mass.

[73] Assignee: AT&T Corp., Murray Hill, N.J.

[21] Appl. No.: 855,782

[22] Filed: Mar. 26, 1992

[51] Int. Cl.⁶ .............................................. H04J 1/06
[52] U.S. Cl. ................................... 370/16.1; 340/827
[58] Field of Search ...................... 370/16, 16.1, 85.12, 370/85.13, 85.14, 85.15; 371/8.1, 11.1; 379/221, 230; 340/825.01, 827

[56] References Cited

U.S. PATENT DOCUMENTS

| | | | |
|---|---|---|---|
| 4,593,154 | 6/1986 | Takeda et al. | 370/16.1 |
| 4,759,009 | 7/1988 | Casidy et al. | 370/55 |
| 5,003,531 | 3/1991 | Farinholt et al. | 370/16.1 |
| 5,179,548 | 1/1993 | Sandesara | 370/16.1 |
| 5,218,604 | 7/1993 | Sosnosky | 370/16.1 |

OTHER PUBLICATIONS

"SONET Add-Drop Multiplex Equipment (SONET ADM) Generic Criteria for a Unidirectional Path Protection Switched, Self-Healing Ring Implementation", TA-TSY-000496, Issue 3, Aug. 1990, Bellcore.
"SONET Line Protection Switched Ring APS Protocol", T1X1.5/91-026, J. Baroni et al., AT&T Network Systems.
"SONET Rings: Proposal for K Byte Definition", Contribution to T1 Standards Project-T1X1.5, Nov. 5, 1990, G. Copley et al.

Primary Examiner—Douglas W. Olms
Assistant Examiner—Dang Ton
Attorney, Agent, or Firm—Mark K. Young; Thomas Stafford

[57] ABSTRACT

Misconnections between communications circuits in a bidirectional line-switched ring transmission system are essentially eliminated by deterministically squelching in adjacent ring nodes, i.e., loop-back-switching nodes, communications circuits terminated in failed ring nodes in the ring transmission system. The deterministic squelching is realized by provisioning the ring nodes with all active communications circuits including those passing through the node which are terminated in other ring nodes in the bidirectional line-switched ring transmission system. Then, when one or more adjacent ring nodes fail, all active communications circuits terminated in those failed ring nodes are squelched in the adjacent ring nodes, i.e., in the loop-back-switching ring nodes.

21 Claims, 8 Drawing Sheets

FIG. 5

| NODE ID |
|---|
| 101 ID |
| 102 ID |
| 103 ID |
| 104 ID |

FIG. 6

| STS-M # | A TERMINATION | Z TERMINATION(S) |
|---|---|---|
| b | 104 | 101,102 |
| c | 103 | 101 |
| d | 102 | 101 |
| e | 103 | 102 |
| f | 103 | 104 |
| ⋮ | ⋮ | ⋮ |

FIG. 7

| STS-M # | A TERMINATION | Z TERMINATION(S) |
|---|---|---|
| a | 101 | 103 |
| c | 103 | 101 |
| d | 102 | 101 |
| e | 103 | 102 |
| f | 103 | 104 |
| ⋮ | ⋮ | ⋮ |

APPARATUS AND METHOD FOR PREVENTING COMMUNICATIONS CIRCUIT MISCONNECTIONS IN A BIDIRECTIONAL LINE-SWITCHED RING TRANSMISSION SYSTEM

CROSS-REFERENCE TO RELATED APPLICATION

U.S. patent application Ser. No. 07/855,795 was filed concurrently herewith.

TECHNICAL FIELD

This invention relates to ring transmission systems and, more particularly, to bidirectional line-switched ring transmission systems.

BACKGROUND OF THE INVENTION

It is known that misconnections between telephone communications circuits can possibly occur in bidirectional line-switched ring transmission systems under ring node failure conditions. Accordingly, arrangements have been devised to prevent such misconnections. Specifically, the prior known arrangements employ a so-called squelching mechanism at the ring node which includes either the communications circuit entry or exit point on the ring that has a communications circuit terminating in a failed ring node. Although the occurrence of a communications circuit misconnection, intelligible or otherwise, for any duration, however short, is extremely undesirable and is to be avoided, the known arrangements are effective only to prevent so-called "long term" misconnections. "Short term", or transitory, misconnections am still a real possibility.

SUMMARY OF THE INVENTION

The problem of undesired telephone communications circuit misconnections occurring in prior bidirectional line-switched ring transmission systems is overcome, in accordance with the invention, by deterministically eliminating all possible communications circuit misconnections. This deterministic elimination of communications circuit misconnections is realized, in accordance with the principles of my invention, by controllably squelching, i.e., blocking, communications circuits terminated in failed ring node(s) in ring nodes adjacent to the failed ring node(s), i.e., the loop-back-switching ring nodes for the failed ring node(s). To this end, communications circuit provisioning information for each particular ring node includes the identity of all the ring nodes in which communications circuits active in the particular ring node terminate. The provisioning information is provided whether the communications circuits are to be added and/or dropped by the particular ring node or passed through the particular ring node.

BRIEF DESCRIPTION OF THE DRAWING

In the drawing:

FIG. 5 is an exemplary ring node ID table included in memory of the controller of FIG. 2;

FIG. 6 is an exemplary communications circuit ID table also included in memory of the controller of FIG. 2 for ring node 104;

FIG. 7 is an exemplary communications circuit ID table included in memory of the controller of FIG. 2 for ring node 103;

DETAILED DESCRIPTION

Figure 1:
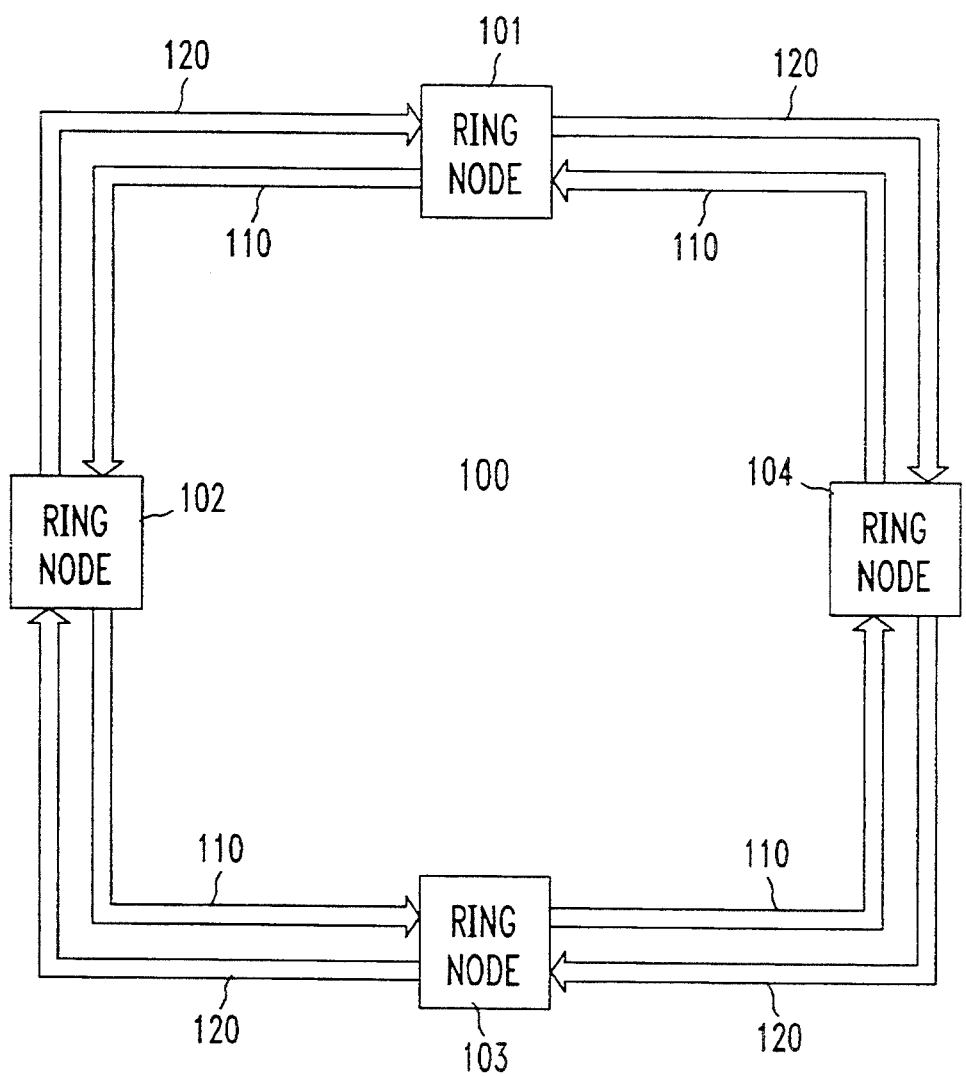
FIG. 1 shows, in simplified block diagram form, a bidirectional line-switched ring transmission system including ring nodes incorporating the invention.

FIG. 1 shows, in simplified form, bidirectional line-switched ring transmission system 100, which for brevity and clarity of exposition is shown as including only ring nodes 101 through 104, each incorporating an embodiment of the invention. Ring nodes 101 through 104 are interconnected by transmission path 110 in a counter-clockwise direction and by transmission path 120 in a clockwise direction. In this example, transmission paths 110 and 120 are comprised of optical fibers and each could be comprised of a single optical fiber or two (2) optical fibers. That is, bidirectional line-switched ring transmission system 100 could be either a two (2) optical fiber or a four (4) optical fiber system. In a two (2) optical fiber system, each of the fibers in transmission paths 110 and 120 includes service bandwidth and protection bandwidth. In a four (4) optical fiber system, each of transmission paths 110 and 120 includes an optical fiber for service bandwidth and a separate optical fiber for protection bandwidth. Such bidirectional line-switched ring transmission systems are known. In this example, transmission of digital signals in the SONET digital signal format is assumed. However, it will be apparent that the invention is equally applicable to other digital signal formats, for example, the CCITT synchronous digital hierarchy (SDH) digital signal formats. In this example, it is assumed that an optical OC-N SONET digital signal format is being utilized for transmission over transmission paths 110 and 120. The SONET digital signal formats are described in a Technical Advisory entitled "Synchronous Optical Network (SONET) Transport Systems: Common Generic Criteria", TA-NWT-000253, Bell Communications Research, Issue 6, September 1990.

It is noted that requests and acknowledgments for protection switch action are transmitted in an automatic protection switch (APS) channel in the SONET overhead accompanying the protection bandwidth on each of transmission paths 110 and 120. The APS channel, in the SONET format, comprises the K1 and K2 bytes in the SONET overhead of the protection bandwidth. The K1 byte indicates a request of a communications circuit for switch action. The first four (4) bits of the K1 byte indicate the switch request priority and the last four (4) bits indicate the ring node identification (ID). The K2 byte indicates an acknowledgment of the requested protection switch action. The first four (4) bits of the K2 byte indicate the ring node ID and the last 4 bits indicate the action taken. For purposes of this description, a "communications circuit" is considered to be a SONET STS-3 digital signal having its entry and exit points on the ring.

Each of ring nodes 101 through 104 comprises an add-drop multiplexer (ADM). Such add-drop multiplexer arrangements are known. For generic requirements of a SONET based ADM see the Technical Reference entitled "SONET ADD-DROP Multiplex Equipment (SONET ADM) GENERIC CRITERIA", TR-TSY-000496, Issue 2, September 1989, Supplement 1, September 1991, Bell Communications Research. In this example, the ADM operates in a transmission sense to pass signals through the ring node, to add signals at the ring node, to drop signals at the ring node, to bridge signals during a protection switch and to loop-back-switch signals during a protection switch at the ring node.

Figure 2:
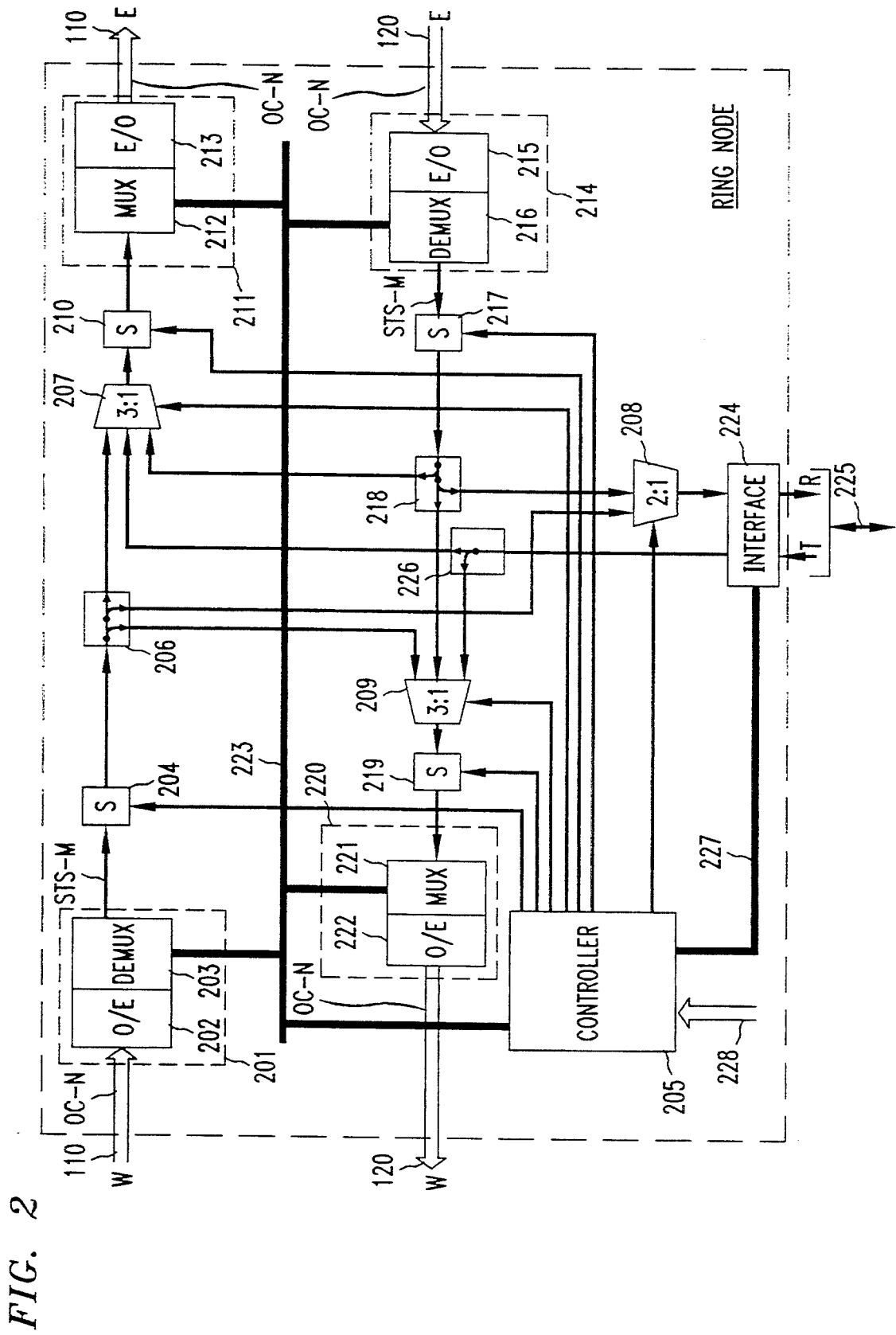
FIG. 2 shows, in simplified block diagram form, details of a ring node including an embodiment of the invention.
Figure 3:
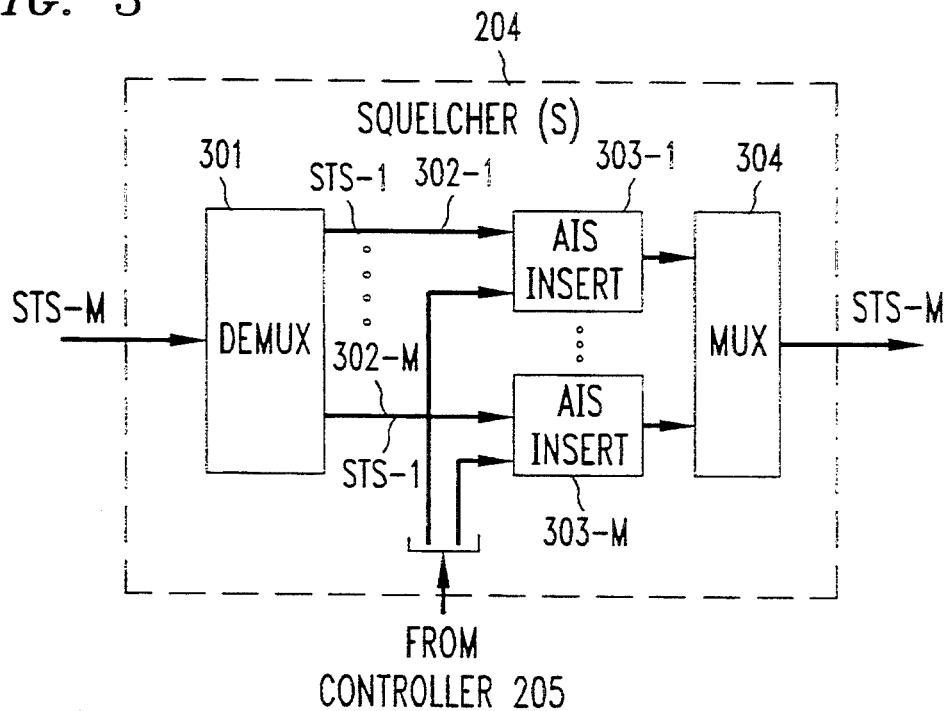
FIG. 3 shows, in simplified block diagram form, details of a squelcher used in the ring node of FIG. 2.
Figure 4:
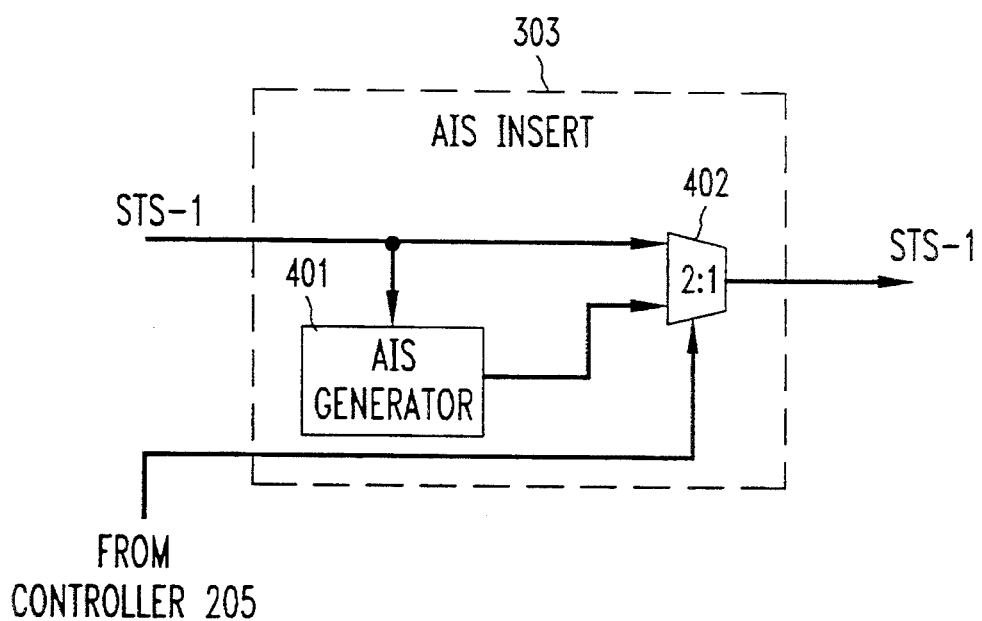
FIG. 4 shows, in simplified block diagram form, details of an AIS insert unit employed in the squelcher of FIG. 3.

FIG. 2 shows, in simplified block diagram form, details of ring nodes 101 through 104, including an embodiment of the invention. In this example, a west (W)-to-east (E) digital signal transmission direction is assumed in the service bandwidth and the protection bandwidth on transmission path 110. It will be apparent that operation of the ring node and the ADM therein would be similar for an east (E)-to-west (W) digital signal transmission direction in the service bandwidth and the protection bandwidth on transmission path 120. Specifically, shown is transmission path 110 entering the ring node and supplying an OC-N SONET optical signal to receiver 201, where N could be, for example, 12 or 48. Receiver 201 includes an optical/electrical (O/E) interface 202 and a demultiplexer (DEMUX) 203, which yields at least one (1) STS-M SONET digital signal. Such O/E interfaces and demultiplexers are known. In this example, M is assumed to be three (3) and N is greater than M. The STS-M signal output from DEMUX 203 is supplied to squelcher (S) 204 which under control of controller 205 controllably squelches, i.e., blocks, particular incoming communications circuits by inserting an alarm indication signal (AIS), as described below. Details of squelcher (S) 204 are shown in FIGS. 3 and 4 and its operation is described below. Thereafter, the STS-M signal, squelched or otherwise, is supplied to broadcast element 206. A broadcast element replicates the STS-M signal supplied to it and supplies the replicated signals as a plurality of individual outputs. Such broadcast elements are known. Broadcast element 206 generates three identical STS-M signals and supplies one STS-M signal to an input of 3:1 selector 207, a second STS-M signal to an input of 2:1 selector 208 and a third STS-M signal to an input of 3:1 selector 209. An STS-M signal output from 3:1 selector 207 is supplied to squelcher (S) 210, which is identical to squelcher (S) 204. Squelcher (S) 210 is employed, under control of controller 205, to squelch particular outgoing communications circuits. The STS-M signal output from squelcher (S) 210 is supplied to transmitter 211 and, therein, to multiplexer (MUX) 212. The output of MUX 212 is an electrical OC-N digital signal, which is interfaced to transmission path 110 via electrical/optical (E/O) interface 213. Such multiplexers (MUXs) and electrical/optical (E/O) interfaces are well known.

Similarly, in the east (E)-to-west (W) direction an OC-N optical signal is supplied via transmission path 120 to receiver 214 and, therein, to optical/electrical (O/E) interface 215. In turn, demultiplexer (DEMUX) 216 yields a STS-M signal which is supplied via squelcher (S) 217 to broadcast element 218. Broadcast element 218 replicates the STS-M signal into a plurality of identical STS-M signals, in this example, three (3). One STS-M signal is supplied to an input of 3:1 selector 207, a second STS-M signal is supplied to an input of 2:1 selector 208 and a third STS-M signal is supplied to an input of 3:1 selector 209. An output from 3:1 selector 209 is supplied via squelcher (S) 219 to transmitter 220. In transmitter 220, multiplexer (MUX) 221 multiplexes the STS-M into an electrical OC-N and, then, electrical/optical (E/O) interface 222 supplies the optical OC-N signal to transmission path 120.

Controller 205 operates to effect the deterministic squelching of communications circuits, in accordance with the principles of the invention. Controller 205 communicates with receivers 201 and 214 and transmitters 211 and 220 via bus 223 and with interface 224 via bus 227. Specifically, controller 205 monitors the incoming digital signals to determine loss-of-signal, SONET format K bytes and the like. Additionally, controller 205 causes the insertion of appropriate K byte messages for protection switching purposes, examples of which are described below. To realize the desired deterministic squelching of the communications circuits, controller 205 is advantageously provisioned via bus 228 with the identifies (IDs) of of all the communications circuits passing through the ring node, as well as, those communications circuits being added and/or dropped at the ring node and the identities of all the ring nodes in bidirectional line-switched ring 100. The squelching of communications circuits under control of controller 205 to effect the invention is described below.

Interface 224 is employed to interface to a particular duplex link 225 and could include any desired arrangement. For example, interface 224 could include a DS3 digital signal interface to a DSX, a STS-1E (electrical) SONET digital signal interfacing to a DSX, an optical extension interface to an OC-N SONET optical signal or the like. Such interface arrangements are known. Specifically, a signal (R) to be dropped at the ring node is supplied to interface 224 via 2:1 selector 208, under control of controller 205, from either broadcast element 206 or broadcast element 218. In turn, interface 224 supplies the appropriate signal to duplex link 225. A signal (T) to be added at the ring node is supplied from duplex link 225 to interface 224 where it is converted to the STS-M digital signal format, if necessary. The STS-M digital signal is then supplied to broadcast element 226 where it is replicated. The replicated STS-M digital signals are supplied by broadcast element 226 to an input of 3:1 selector 207 and an input of 3:1 selector 209. In this example, 3:1 selectors 207 and 209, under control of controller 205, select the signal being added for transmission in the service bandwidth or the protection bandwidth on either transmission path 110 or transmission path 120.

It should be noted that, in this example, the normal transmission path for a digital signal being added at the ring node would be in the service bandwidth on transmission path 110 and transmission path 120, for example, towards the west (W). If there were to be a protection switch, the signal (T) being added from interface 224 would be bridged via broadcast element 226 and chosen by 3:1 selector 207, under control of controller 205, to the protection bandwidth on transmission path 110. Similarly, if there were to be a loop-back protection switch and the ring node was adjacent to the failure, the signal (R) to be dropped at the ring node would be received in the protection bandwidth on transmission path 120 and would be switched from broadcast element 218 via 2:1 selector 208 to interface 224. It is noted that "failure" or "ring node failure' as used herein is intended to include node equipment failure and so-called node isolation failure caused by optical fiber cuts, cable cuts or the like. Otherwise, the signal (R) to be dropped would be switched in a ring node adjacent the failure from the protection bandwidth on transmission path 120 to the service bandwidth on transmission path 110 and received at the ring node in usual fashion. Then, the signal (R) being dropped from transmission path 110 is supplied via broadcast element 206 and 2:1 selector 208 to interface 224.

As indicated above, controller 205 monitors the status of interface 224 and the digital signal supplied thereto via bus 227. Specifically, controller 205 monitors interface 224 for loss-of-signal, coding violations and the like, i.e., a signal failure condition.

Under control of controller 205, digital signals may be passed through, added at, dropped at, bridged at or loop-back-switched at the ring node. A loop-back-switch of an STS-M digital signal incoming in the service bandwidth on transmission path 110 is effected by controller 205 causing 3:1 selector 209 to select the STS-M digital signal from broadcast element 206 and supplying it via squelcher (S) 219 to transmitter 220. In turn, transmitter 220 supplies an OC-N optical signal to the protection bandwidth on transmission path 120. It will be apparent that in the loop-back-switch operation, if the signal is incoming in a service bandwidth on transmission path 110, it will be loop-back-switched to the protection bandwidth on transmission path 120 and vice versa. If the signal is incoming in protection bandwidth on transmission path 110, it will be loop-back-switched to the service bandwidth on transmission path 120 and vice versa. A signal to be added at the ring node is supplied from interface 224, replicated via broadcast element 226 and selected either by 3:1 selector 207 or 3:1 selector 209, under control of controller 205, to be added on transmission path 110 or transmission path 120, respectively. A digital signal to be dropped at the ring node is selected by 2:1 selector 208, under control of controller 205, either from broadcast element 206 (transmission path 110) or broadcast element 218 (transmission path 120). The pass-through and loop-back-switch functions for a signal incoming on transmission path 120 is identical to that for an incoming signal on transmission path 110.

Possible communications circuit misconnections are avoided in bidirectional line-switched ring 100, in accordance with the invention, by deterministically squelching communications circuits terminated in a failed ring node in ring nodes adjacent to the failed ring nodes(s). The adjacent failed ring nodes can include a plurality of nodes including those that appear to be failed because of being isolated by other failed ring nodes or by fiber and/or cable cuts. To this end, each ring node in bidirectional line-switched ring transmission system 100 is typically equipped to effect the desired squelching via squelchers (S) 204, 210, 217 and 219, under control of controller 205. In this example, both incoming and outgoing communications circuits are squelched, however, it may only be necessary to squelch outgoing communications circuits.

FIG. 3 shows, in simplified block diagram form, details of an exemplary squelcher (S) unit. Specifically, the STS-M digital signal is supplied to demultiplexer (DEMUX) 301 where it is demultiplexed into its constituent M STS-1 digital signals 302-1 through 302-M. The M STS-1 digital signals are supplied on a one-to-one basis to AIS insert units 303-1 through 303-M. AIS insert units 303-1 through 303-M, under control of controller 205, insert the AIS in the STS-1 digital signals included in the communications circuits, i.e., STS-M digital signals, to be squelched. Details of AIS insert units 303 are shown in FIG. 4 and described below. Thereafter, the M STS-1 digital signals are multiplexed in multiplexer (MUX) 304 to yield the desired STS-M digital signal. The details of multiplex schemes for the STS-M digital signal are described in the technical advisory TA-NWT-000253, noted above.

FIG. 4 shows, in simplified block diagram form, details of AIS insert units 303. Specifically, shown is a STS-1 digital signal being supplied to AIS generator 401 and to one input of 2:1 selector 402. AIS generator 401 operates to insert AIS in the STS-1 digital signal. As indicated in the technical advisory TA-NWT-000253, the STS path AIS is an all ones (1's) signal in the STS-1 overhead bytes H1, H2 and H3 and the bytes of the entire STS SPE (synchronous payload envelope). Selector 402 selects as an output, under control of controller 205, either the incoming STS-1 digital signal or the STS-1 digital signal with AIS inserted from AIS generator 401.

FIG. 5 is a table including the identification (ID) of ring nodes 101 through 104. The ring node IDs are stored in a look-up table which is provisioned via 228 in memory of controller 205. As indicated above, the ring node IDs are 4 bit words and are included in the second 4 bits of the K1 bytes and the first 4 bits of the K2 bytes in the APS channel.

FIG. 6 is illustrative of a table including the identification of all the active communications circuits in a ring node, in this example, ring node 104, for a counter-clockwise orientation of nodes 101 through 104. The active communications circuits include those being added, being dropped or passing through ring node 104. The table including the IDs of the active communications circuits in the ring node are provisioned via 228 in a look-up table in memory of controller 205. Shown in the table of FIG. 6 are the STS-M communications circuit numbers (#) b through f, the ring node including the communications circuit entry point, i.e., the A termination for the communications circuit, and the ring node(s) including the communications circuit exit point(s), i.e., the Z termination(s) for the communications circuit. For a communications circuit, for example STS-M(b), which is being broadcast to a plurality of ring nodes, all the Z termination ring nodes are shown. Thus, the communications circuit ID table of FIG. 6, shows that STS-M(b) enters ring 100 at ring node 104 and is broadcast to ring nodes 101 and 102, STS-M(c) enters ring 100 at ring node 103 and exits at ring node 101, STS-M(d) enters ring 100 at ring node 102 and exits at ring node 101, STS-M(e) enters ring 100 at ring node 103 and exits at ring node 102 and STS-M(f) enters ring 100 at ring node 103 and exits at ring node 104. Although the ring nodes designated A terminations are considered entry points and the ring nodes designated Z terminations are considered exit points, it will be apparent that the individual communications circuits may be duplex circuits having entry and exit points at each such node. It should be noted that heretofore only the identities of communications circuits being added and/or dropped at the node were provisioned therein, but not those communications circuits passing through the ring.

FIG. 7 is illustrative of a table including the identification of all the active communications circuits in a ring node, in this example, ring node 103. The active communications circuits include those being added, being dropped or passing through ring node 103. The table including the IDs of the active communications circuits in the ring node are provisioned in a look-up table in memory of controller 205. Shown in the table of FIG. 7 are the STS-M communications circuit numbers (#) a and c through f, the ring node including the communications circuit entry point, i.e., the A termination for the communications circuit, and the ring node(s) including the communications circuit exit point(s), i.e., the Z termination(s) for the communications circuit. Thus, the communications circuit ID table of FIG. 7, shows that STS-M(a) enters ring 100 at ring node 101 and exits ring 100 at ring node 103, STS-M(c) enters ring 100 at ring node 103 and exits at ring node 101, STS-M(d) enters ring 100 at ring node 102 and exits at ring node 101, STS-M(e) enters ring 100 at ring node 103 and exits at ring node 102 and STS-M(f) enters ring 100 at ring node 103 and exits at ring node 104. Although the ring nodes designated A terminations are considered entry points and the ring nodes designated Z terminations are considered exit points, it will be apparent that the individual communications circuits may be duplex circuits having entry and exit points at each such node.

Figure 8:
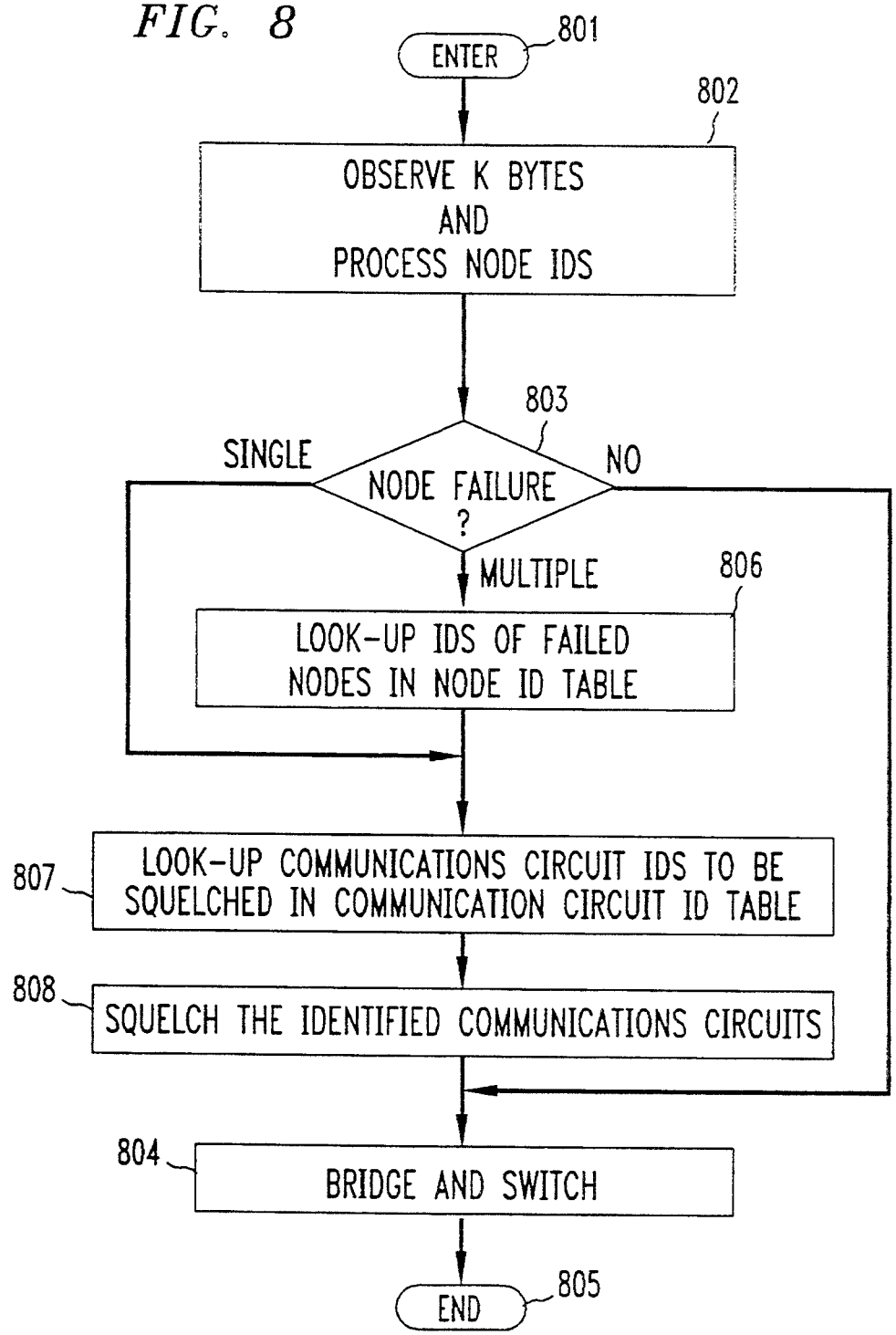
FIG. 8 is a flow chart illustrating the squelch operation of the controller of FIG. 2.

FIG. 8 is a flow chart illustrating the operation of controller 205 in controlling the operation of the ring nodes in order to effect the deterministic squelching of communications circuits in the presence of a failure, in accordance with the invention. Specifically, the process is entered via step 801. Then, operational block 802 causes the K bytes of an incoming OC-N signal to be observed and processes the ring node IDs therein. Then, conditional branch point 803 tests to determine if the processed ring node IDs indicate that one or more ring nodes have failed. Again, a ring node failure is defined as to include node equipment failure and so-called node isolation failure caused by fiber cuts and the like. Specific examples of failure conditions are discussed below. Thus, if the processed ring node IDs indicate no ring node failure, the failure is other than a ring node and operational block 804 causes the usual bidirectional ring bridging and switching to be effected. Thereafter, the process is ended via step 805. If the processed ring node IDs indicate a multiple ring node failure, operational block 806 causes the failed ring node IDs to be obtained from the ring node ID look-up table in memory. Then, control is passed to operational block 807 which causes the identity (ID) of the affected communications circuits to be obtained from the communications circuit ID look-up table in memory. If step 803 indicates a single ring node failure, the failed ring node ID is already known and control is passed directly to step 807. Once the affected communications circuits are identified, operational block 808 causes the appropriate ones of squelchers (S) 204, 210, 217 and 219 (FIG. 2), in this example, to squelch those identified communications circuits in the ring node. As indicated above, all communications circuits active in this ring node that are terminated in a failed ring node are squelched, in accordance with the invention. For the purpose of squelching a broadcast communications circuit, only the first "A" and last "Z" terminations are used to trigger the squelching. Operational block 804 causes the communications circuits not terminated in the failed ring node(s) to be bridged and switched to "heal" the ring. Thereafter, the process is ended in step 805.

Figure 9:
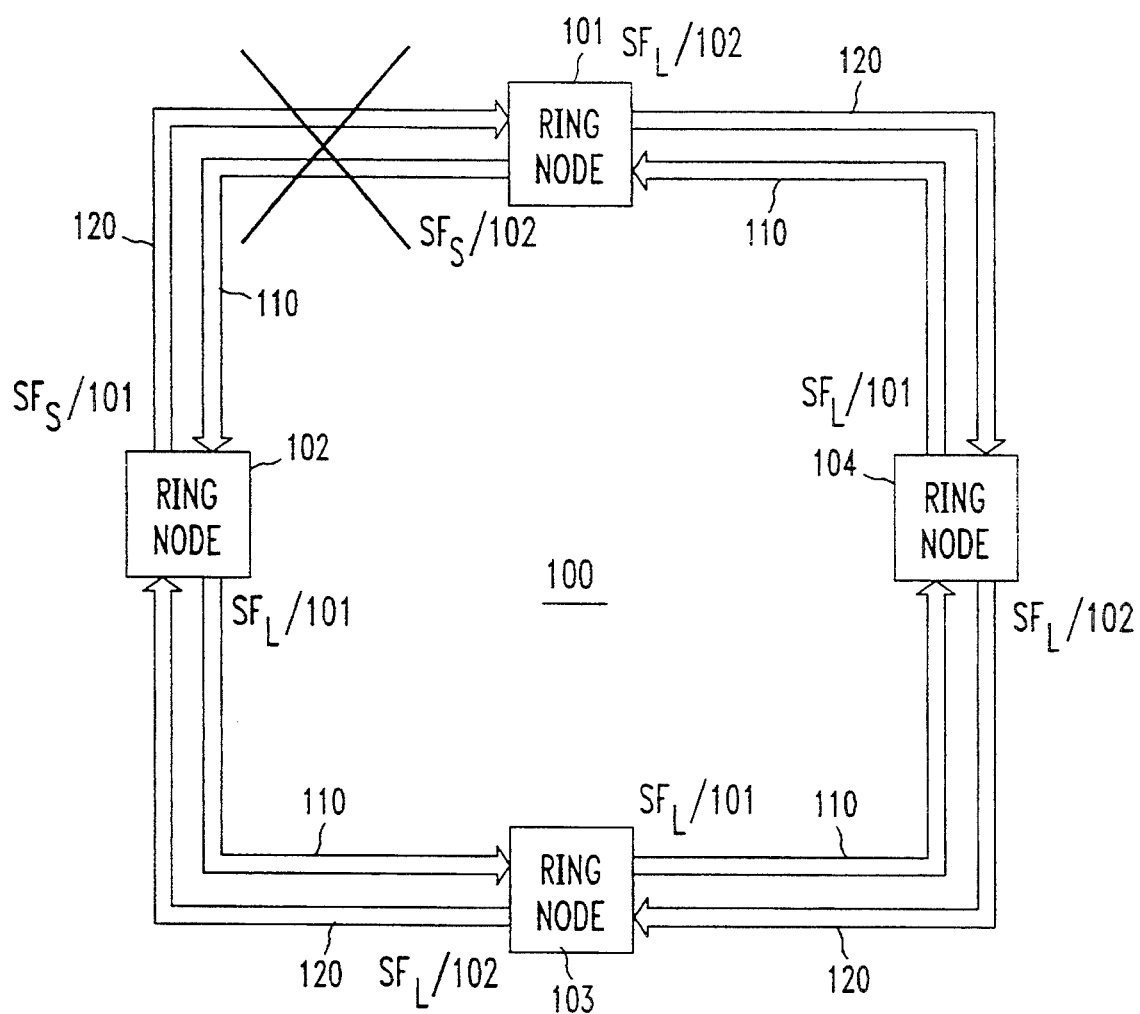
FIG. 9 illustrates the failure message transmission for a complete fiber failure in the bidirectional line-switched ring transmission system.

FIG. 9 illustrates the failure message transmission in the automatic protection switch (APS) channel K1 bytes for a transmission path failure in bidirectional line-switched ring 100. In this example, the failure is shown as being in transmission paths 110 and 120 between ring nodes 101 and 102. Ring node 101 detects loss-of-signal from ring node 102 on incoming transmission path 120. Loss-of-signal as used herein is intended to include other indicators such as loss-of-frame, high bit error rate or the like. Then, ring node 101 transmits a line-switch request message identifying the signal from ring node 102 as having failed in the APS channel K1 byte on transmission path 120 away from the failure toward ring node 104. This line-switch request message is designated $SF_L/102$. Ring node 101 also transmits a span-switch request message in the APS channel K1 byte on transmission path 110 towards the failure. The span-switch request message is designated $SF_S/102$. It should be noted, however, that a span switch request is only issued and can only be realized in a four (4) fiber bidirectional line-switched ring transmission system 100. Ring node 104 recognizes that the line-switch request message $SF_L/102$ in the incoming APS channel K1 byte does not identify an adjacent ring node and passes the line-switch request message on to ring node 103. Similarly, ring node 103 passes the line-switch request message on to ring node 102. In turn, ring node 102 recognizes its own ID in the $SF_L/102$ line-switch request message, which indicates to ring node 102 that a ring node has not failed. Since there was no ring node failure, there is no need to squelch any of the communication circuits active in ring node 102. Ring node 102 does, however, effect a loop-back-switch of communications circuits received at the ring node in the service bandwidth on transmission path 120 to the protection bandwidth on transmission path 110 for communications circuits intended for other ring nodes in ring 100. Ring node 102 also effects a ring loop-back-switch of communication circuits entering the node that were intended to be transmitted in the service bandwidth on transmission path 120 to the protection bandwidth on transmission path 110. Any communication circuits received at ring node 102 that are intended to be dropped from either the service bandwidth or protection bandwidth on transmission path 120, are supplied as described above, under control of controller 205, to interface 224 (FIG. 2).

Similarly, ring node 102 detects a loss-of-signal from ring node 101 on transmission path 110 because of the failure in transmission paths 110 and 120 between ring nodes 101 and 102. Then, ring node 102 transmits a line-switch request message identifying the signal from ring node 101 as having failed in the APS channel K1 byte on transmission path 110. This line-switch request message is designated $SF_L/101$. Ring node 102 also transmits a span-switch request message in the APS channel K1 byte on transmission path 120 towards the failure. The span-switch request message is designated $SF_S/101$. Again, it should be noted that a span switch request is only issued and can only be realized in a four (4) fiber bidirectional line-switched ring transmission system 100. Ring node 103 recognizes that the line-switch request $SF_L/101$ in the incoming APS channel K1 byte does not identify an adjacent ring node and passes the line-switch request message on to ring node 104. Similarly, ring node 104 passes the line-switch request message on to ring node 101. In turn, ring node 101 recognizes its own ID in the $SF_L/101$ line-switch request message, which indicates to ring node 101 that a ring node has not failed. Since there was no ring node failure, there is no need to squelch any of the communication circuits active in ring node 101. Ring node 101 does, however, effect a loop-back-switch of communications circuits received at the ring node in the service bandwidth on transmission path 110 to the protection bandwidth on transmission path 120 for communications circuits intended for other ring nodes in ring 100. Ring node 101 effects a ring loop-back-switch of communications circuits entering the node that were intended to be transmitted in the service bandwidth on transmission path 110 to the protection bandwidth on transmission path 120. Any communications circuits received at ring node 101 that are intended to be dropped from either the service bandwidth or protection bandwidth on transmission path 110, are supplied as described above, under control of controller 205 to interface 224 (FIG. 2).

Figure 10:
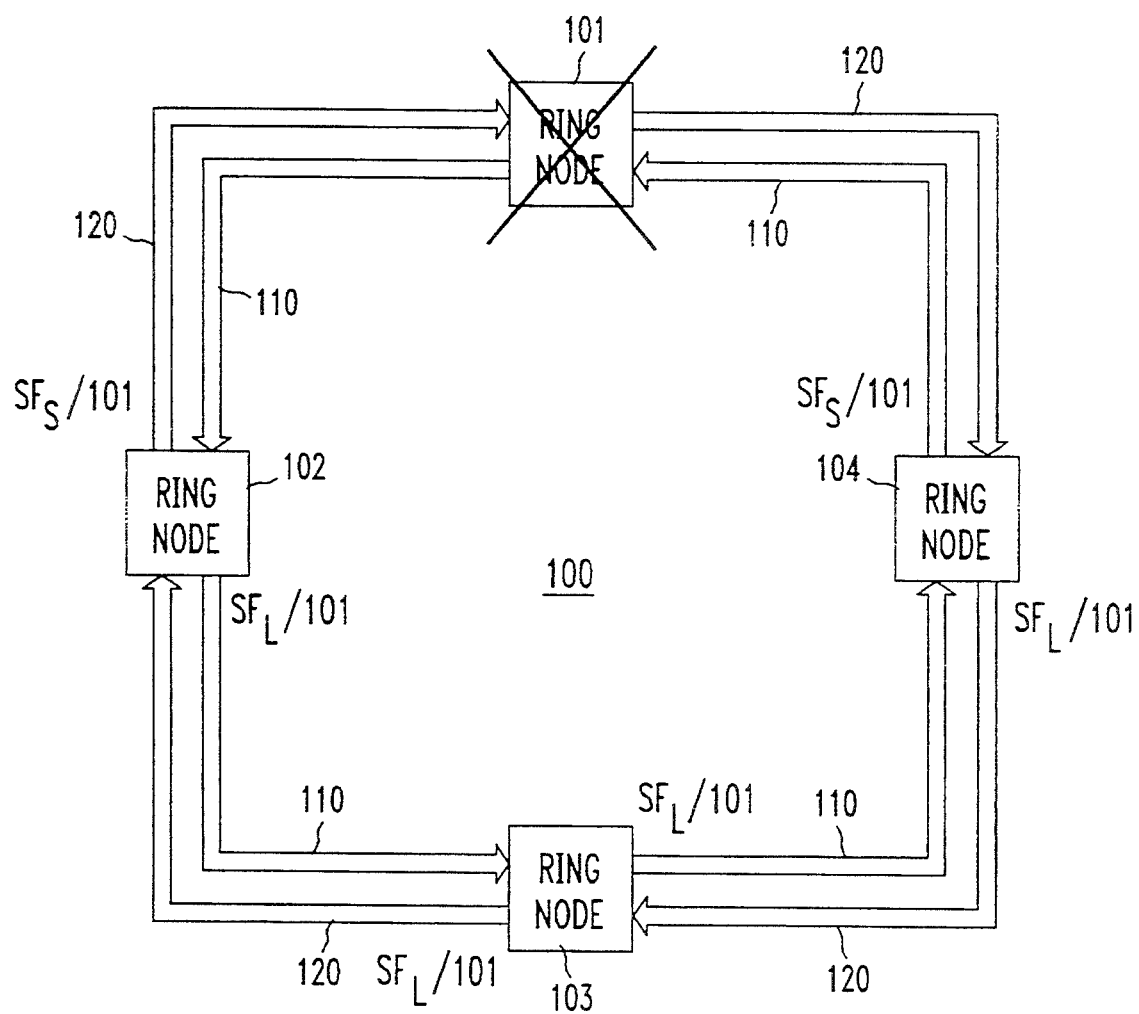
FIG. 10 illustrates the failure message transmission for a single ring node failure in the bidirectional line-switched ring transmission system.

FIG. 10 illustrates the failure message transmission in the automatic protection switch (APS) channel via the K1 byte for a single ring node failure in bidirectional line-switched ring 100. In this example, the failure is shown as being in ring node 101. Ring node 102 detects a loss-of-signal from ring node 101 on transmission path 110 because of the failure of node 101. Then, ring node 102 transmits a line-switch request message identifying the signal from ring node 101 as having failed in the APS channel K1 byte on transmission path 110 away from the failure toward ring node 103. This line-switch request signal is designated $SF_L/101$. Ring node 102 also transmits a span-switch request message from the APS channel K1 byte on transmission paths 120 towards failed node 101. The span-switch request message is designated $SF_S/101$. As indicated above, a span-switch is only issued and can only be realized in a four (4) fiber bidirectional line-switched ring transmission system 100. Ring node 103 recognizes that the line-switch request message $SF_L/101$ in the incoming APS channel K1 byte does not identify an adjacent ring node and, therefore, passes the line-switch request message on to ring node 104. Ring node 104 recognizes that the line-switch request message $SF_L/101$ includes the 1D of the adjacent failed ring node 101. A single node failure is indicated because ring node 104 has also detected loss-of-signal from ring node 101 on transmission path 120. Consequently, ring node 104, under control of controller 205 (FIG. 2), causes all active communications circuits in ring node 104 intended for ring node 101 to be squelched, in accordance with the invention. The squelching is realized as described above in conjunction with FIG. 2 and the process of FIG. 8. Specifically, referring to the communications circuit ID table for ring node 104 in FIG. 6, it is seen that communications circuits STS-M (c) and STS-M (d) are to be squelched, in accordance with the invention. Communications circuit STS-M (b) is identified as being broadcast to both ring nodes 101 and 102. Since it is still desired to broadcast the STS-M(b) communications circuit to ring node 102, no squelching is effected for it. This does not cause any communications circuit misconnection because the communications circuit continues its transmission past the failed ring node on to the non-failed next broadcast ring node. Thus, communications circuit STS-M(b) is ring loop-back-switched in ring node 104 to the protection bandwidth on transmission path 120 and supplied thereon to ring node 102 where it is appropriately dropped, in a manner as described above. Communications circuit STS-M(e) incoming to ring node 104 in the service bandwidth on transmission path 110 is loop-back- switched to the protection bandwidth on transmission path 120 and supplied thereon to ring node 102 where it is appropriately dropped. Communications circuit STS-M(f) is not affected by the failure of node 101 and communications between ring nodes 103 and 104 are realized in normal fashion.

As indicated above, ring node 104 detects a loss-of-signal on transmission path 120 from failed ring node 101. Then, ring node 104 transmits a line-switch request message identifying the signal from ring node 101 as having failed in the APS channel K1 byte on transmission path 120 away from the failure toward ring node 103. Again, this line-switch request message is designated $SF_L/101$. Ring node 104 also transmits a span-switch request message in the APS channel K1 byte on transmission path 110 towards the failed node 101. The span-switch request message is designated $SF_S/101$. As indicated above, a span-switch can only be realized in a four (4) fiber bidirectional line-switched ring transmission system 100. Ring node 103 recognizes that the line-switch request $SF_L/101$ incoming in the APS channel on transmission path 120 does not identify an adjacent failed node and passes the line-switch request message on to ring node 102. Ring node 102 recognizes that the line-switch request message includes the ID of an adjacent failed ring node, namely, ring node 101. A single ring node failure is indicated because ring node 102 has detected loss-of-signal from ring node 101 and has received a line-switch request message identifying node 101 as having failed. Consequently, ring node 102 will squelch all active communications circuits intended for ring node 101. Communications circuits terminated in others of the ring nodes in ring 100 are appropriately bridged and loop-back- switched as required to "heal" the ring 100.

Figure 11:
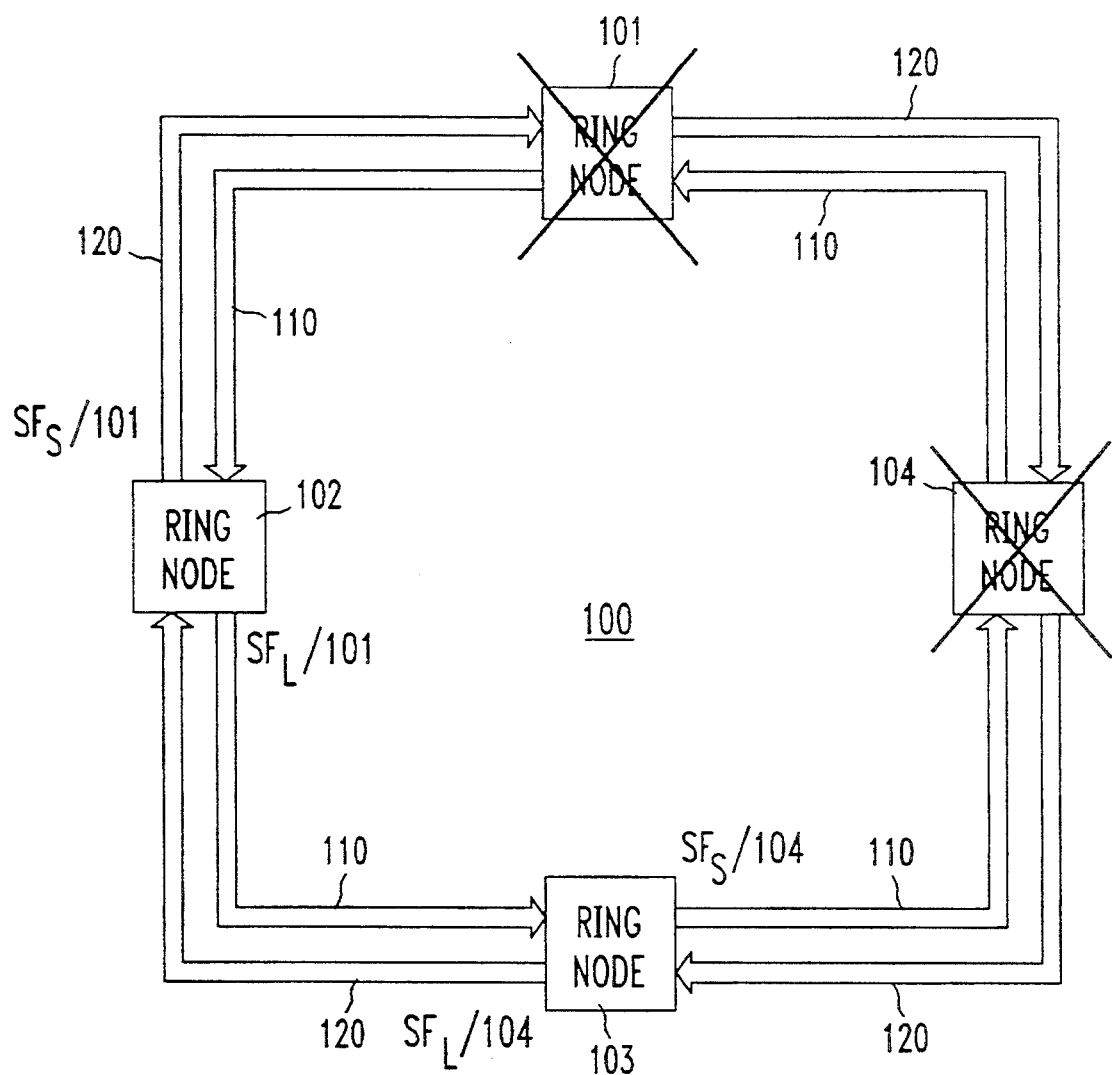
FIG. 11 illustrates the failure message transmission for a multiple ring node failure in the bidirectional line-switched ring transmission system.

FIG. 11 illustrates the failure message transmission in the automatic protection switch (APS) channel via the K1 byte for a multiple ring node failure in bidirectional line-switched ring 100. In this example, the failures are shown as being in ring nodes 101 and 104. Ring node 102 detects a loss-of-signal from ring node 101 on transmission path 110 because of the failure of node 101. Then, ring node 102 transmits a line-switch request message identifying the signal from ring node 101 as having failed away from the failure toward ring node 103 in the APS channel K1 byte on transmission path 110. This line-switch request message is designated $SF_L/101$. Ring node 102 also transmits a span-switch request message from the APS channel K1 byte on transmission paths 120 towards failed ring node 101. The span-switch request message is designated $SF_S/101$. As indicated above, a span-switch request is only be issued and can only be realized in a four (4) fiber bidirectional line-switched ring transmission system 100. Ring node 103 recognizes that the line-switch request message $SF_L/101$ in the incoming APS channel K1 byte does not identify an adjacent failed ring node. However, ring node 103 detects loss-of-signal on transmission path 120 from ring node 104. This loss-of-signal indication in conjunction with the received line-switch request message SF$_L$/101 indicates to ring node 103 that a number of ring nodes have failed, namely; nodes 101 and 104. Since an adjacent ring node has failed, namely, ring node 104, and line-switch request message SF$_L$/101 indicates that ring node 101 has also failed, all active communications circuits in ring node 103 intended for both ring nodes 101 and 104 are to be squelched. The squelching is realized, under control of controller 205, as described above in conjunction with FIG. 2 and the process of FIG. 8. Specifically, referring to the communications circuit ID table for ring node 103 in FIG. 7, it is seen that communications circuits STS-M (a), STS-M (c), STS-M (d) and STS-M (f) are to be squelched, in accordance with the invention. Communications circuit STS-M(e) is not affected by the failure of nodes 101 and 104 and communications between ring nodes 103 and 102 are realized in normal fashion.

Similarly, ring node 103 detects a loss-of-signal on transmission path 120 from failed ring node 104. Then, ring node 103 transmits a line-switch request message identifying the signal from ring node 104 as having failed in the APS channel K1 byte on transmission path 120 away from the failure towards ring node 102. This line-switch request is designated SF$_L$/104. Ring node 103 also transmits a span-switch request message in the APS channel K1 byte on transmission path 120 towards the failed node 104. The span-switch request message is designated SF$_S$/104. As indicated above, a span-switch request is only issued and can only be realized in a four (4) fiber bidirectional line-switched ring transmission system 100. Ring node 102 recognizes the line-switch request message does not identify an adjacent failed ring node. However, ring node 102 has detected loss-of-signal from ring node 101 on transmission path 110. This loss-of-signal indication in conjunction with the received line-switch request message SF$_L$/104 indicates to ring node 102 that ring nodes 101 and 104 have failed. Since an adjacent ring node has failed, i.e., ring node 101 and line-switch request message SF$_L$/104 indicates that ring node 104 has also failed, all active communications circuits in ring node 102 intended for both ring nodes 101 and 104 are to be squelched. The squelching is realized, under control of controller 205, as described above in conjunction with FIG. 2 and the process of FIG. 8. Communications circuits intended for ring nodes other than the failed nodes are bridged and/or loop-back-switched as appropriate to "heal" ring 100.

The above-described arrangements are, of course, merely illustrative of the application of the principles of the invention. Other arrangements may be devised by those skilled in the art without departing from the spirit or scope of the invention. For example, other arrangements may equally be employed to realize the desired squelching of the communications circuits. The squelching may be realized, for example, by simply not bridging or loop-back-switching the communications circuits.

I claim:

1. A first ring node for use in a ring transmission system, comprising:
a means for monitoring signals into the first ring node to determine whether a second ring node in the ring transmission system has failed;
a means responsive to a determination that the second ring node has failed for detecting an active communications circuit passing through the first ring node which is terminated in the second ring node; and
a means for responsive to the detecting means for blocking the active communications circuit which is terminated in the second ring node,
wherein the means for monitoring includes a means for detecting a signal failure condition incoming to the first ring node on either a first or a second transmission path in the ring transmission, the first and second transmission paths connecting a plurality of ring nodes including the first and second ring nodes, and a means for detecting line-switch request messages in digital signals incoming to the first ring node on either of the first and second transmission paths.

2. The apparatus of claim 1 in which each of the first and second transmission paths comprises service bandwidth and protection bandwidth, the line-request message being transported in an automatic protection switch channel in the protection bandwidth of either the first transmission path or the second transmission path.

3. The apparatus of claim 2 in which the automatic protection switch channel comprises at least a K1 byte in overhead of the protection bandwidth.

4. The apparatus of claim 1 further including a means for storing identities of each one of the plurality of ring nodes in the ring transmission system and in which the means for monitoring is responsive to the detected line-switch request messages for obtaining the identity of a failed ones of the plurality of ring nodes from the means for storing the identities.

5. The apparatus of claim 4 further including means for blocking the communications circuits terminated in the failed ones the plurality of ring nodes.

6. The apparatus of claim 4 in which the means for blocking includes a means for generating an alarm indication signal and a means for inserting the alarm indication signal in prescribed byte positions in the communications circuits to be blocked.

7. The apparatus of claim 3 in which the means for detecting a signal failure condition detects a signal failure condition on either the first or second transmission path incoming to the first ring node and further includes a means for generating a line-switch request message including the identity of one of the plurality of ring nodes, if it is adjacent to the first ring node, from the direction that the signal failure condition was detected and a means for inserting the generated line-switch request message in the automatic protection switch channel in the protection bandwidth of one of the first or second transmission paths in a direction away from the detected failed one of the plurality of ring nodes.

8. A ring transmission system, including a plurality of interconnected ring nodes transporting communications circuits around the ring transmission system, at least of one of the interconnected ring nodes comprising:
a means for monitoring signals into the at least one of the interconnected ring nodes to determine whether one of the at least two ring nodes has failed;
a means responsive to a determination that one of the at least two ring nodes has failed for detection an action communications circuit passing though the at least one of the interconnected ring nodes which is terminated in the failed one of the at least two ring nodes; and a means responsive to the detecting means for blocking the active communications circuit terminated in the failed one of at least two ring nodes, wherein the means for monitoring includes a means for detecting a signal failure condition incoming to the one of at least two ring nodes on either a first or a second transmission path in the ring transmission system, the first and second transmission paths connecting the at least two ring nodes, and a means for detecting line-switch request messages in digital signals incoming to the one of at least two ring nodes on either of the first and second transmission paths.

9. The apparatus of claim 8 in which each of the first and second transmission paths comprises service bandwidth and protection bandwidth, the line-request message being transported in an automatic protection switch channel in the protection bandwidth of either the first transmission path or the second transmission path.

10. The apparatus of claim 9 in which the automatic protection switch channel comprises at least a K1 byte in overhead of the protection bandwidth.

11. The apparatus of claim 8 further including a means for storing identities of each of the at least two ring nodes in the ring transmission system and in which the means for monitoring is responsive to the detected line-switch request messages for obtaining the identity of a failed one of the at least two ring nodes from the means for storing the identities.

12. The apparatus of claim 11 further including a means for blocking the communications circuits terminated in the failed one of at least two ring nodes.

13. The apparatus of claim 11 in which the means for blocking includes a means for generating an alarm indication signal and a means for inserting the alarm indication signal in prescribed byte positions in the communications circuits to be blocked.

14. The apparatus of claim 9 in which the means for detecting a signal failure condition detects a signal failure condition on either the first or second transmission path incoming to the one of at least two ring nodes and further includes a means for generating a line-switch request message including the identity of another of the at least two ring nodes, if it is adjacent to the one of at least two ring nodes, from the direction that the signal failure condition was detected and a means for inserting the generated line-switch request message in the automatic protection switch channel in the protection bandwidth of one of the first or second transmission paths in a direction away from the detected failed one of at least two ring nodes.

15. A method for use with at least one of a plurality of interconnected ring nodes in a ring transmission system, the method comprising the steps of:

monitoring signals into the at least one of the interconnected ring nodes to determine whether one of the at least two ring nodes has failed;

detecting an active communications circuit passing through the at least one of the interconnected ring nodes which is terminated in another of the at least two ring nodes; and blocking the active communications circuit which is terminated in the another of the at least two ring nodes, wherein the step of monitoring includes a step of detecting a signal failure condition incoming to the one of at least two ring nodes on either a first or a second transmission path in the ring transmission, the first and second transmission paths connected the at least two ring nodes, and a step of detecting line-switch request messages in digital signals incoming to the one of at least two ring nodes on either of the first and second transmission paths.

16. The method of claim 15 in which each of the first and second transmission paths comprises service bandwidth and protection bandwidth, the line-request message being transported in an automatic protection switch channel in the protection bandwidth of either the first transmission path or the second transmission path.

17. The method of claim 16 in which the automatic protection switch channel comprises at least a K1 byte in overhead of the protection bandwidth.

18. The method of claim 15 further including a step of storing identities of each of the at least two ring nodes in the ring transmission system and in which the step of monitoring is responsive to the detected line-switch request messages for obtaining the identity of a failed one of the at least two ring nodes from the stored identities.

19. The method of claim 18 further including a step of blocking the communications circuits terminated in the failed one of at least two ring nodes.

20. The apparatus of claim 18 in which the step of blocking includes a step of generating an alarm indication signal and a step of inserting the alarm indication signal in prescribed byte positions in the communications circuits to be blocked.

21. The method of claim 16 in which the step for detecting a signal failure condition detects a signal failure condition on either the first or second transmission path incoming to the one of at least two ring nodes and further includes a step for generating a line-switch request message including the identity of another of the at least two ring nodes, if it is adjacent to the one of at least two ring nodes, from the direction that the signal failure condition was detected and a step of inserting the generated line-switch request message in the automatic protection switch channel in the protection bandwidth of one of the first or second transmission paths in a direction away from the detected failed one of at least two ring nodes.

* * * * *